July 20, 1954   J. W. BROWN   2,683,974
CHILD'S EASY-FEEDING DISH
Filed Sept. 13, 1952

INVENTOR.
JACK W. BROWN
BY Carl Miller
ATTORNEY

Patented July 20, 1954

2,683,974

UNITED STATES PATENT OFFICE 2,683,974

CHILD'S EASY-FEEDING DISH

Jack W. Brown, Campinas, Brazil

Application September 13, 1952, Serial No. 309,453

2 Claims. (Cl. 65—15)

This invention relates to a children's easy-feeding dish.

It is an object of the present invention to provide a children's easy-feeding dish which will aid small children both to learn to eat and to keep the food in the dish.

It is another object of the present invention to provide a children's easy-feeding dish which has a removable ring which permits access to the interior of the dish for ready and easy cleaning.

It is still another object of the present invention to provide a children's easy-feeding dish which comprises a partitioned dish and a removable ring, the ring being positioned above the dish to serve as a convenient ledge under which the child may easily get food into his spoon and which prevents him or her from scraping food out onto the table during eating.

It is still another object of the present invention to provide a children's easy-feeding dish of the above type which includes a hot water jacket for keeping the food warm during eating.

It is still another object of the present invention to provide a children's easy-feeding dish which is adapted to be fabricated entirely of plastic and which is adaptable to mass production techniques thereby making it accessible to the consumer at a low cost.

Other objects of the invention are to provide a children's easy-feeding dish bearing the above objects in mind which is of simple construction, inexpensive to manufacture, has a minimum number of parts, is compact, pleasing in appearance, is durable and unbreakable, and which is easy for the child to use and is efficient in operation.

For other objects and for a better understanding of the invention, reference may be had to the following detailed description taken in connection with the accompanying drawing, in which.

Figure 1:
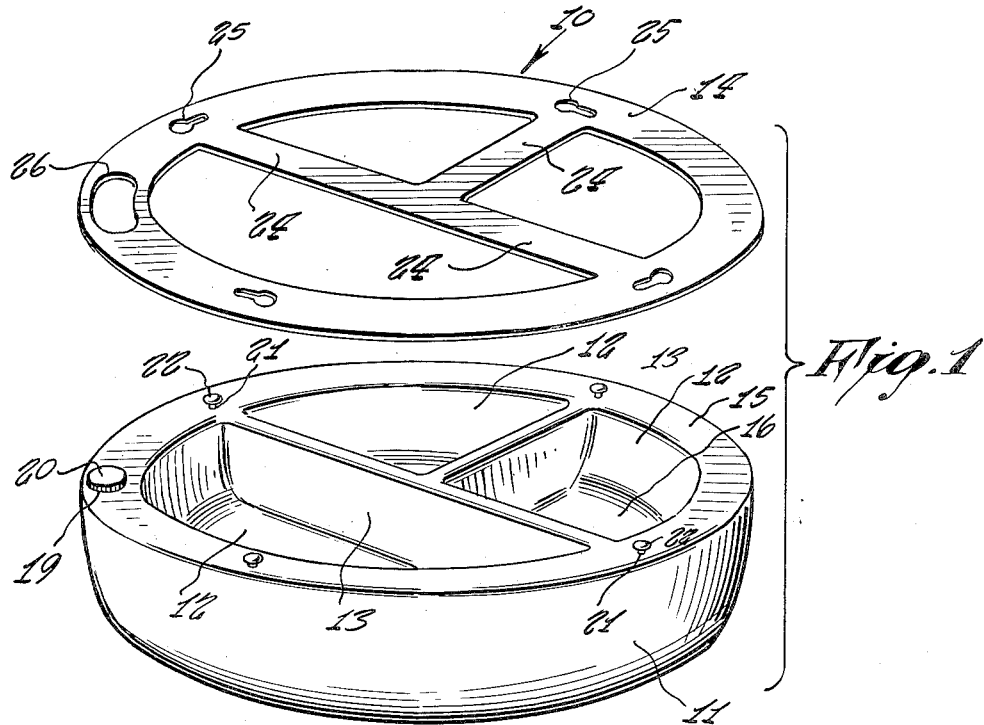
Fig. 1 is an exploded perspective view of the parts comprising the present invention.
Figure 2:
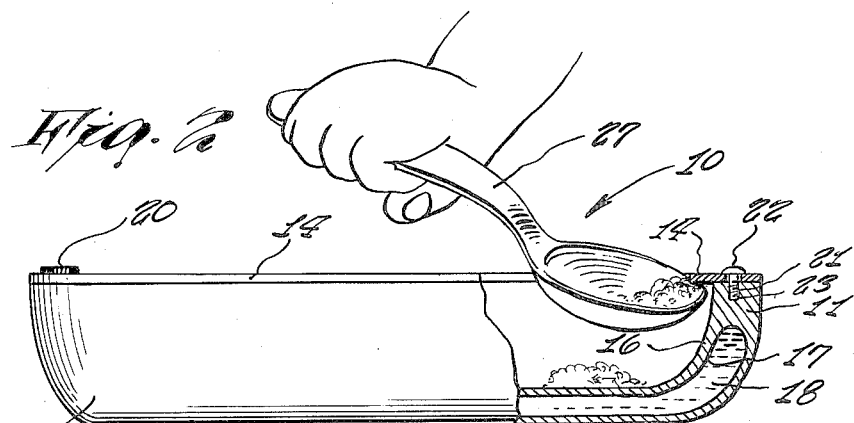
Fig. 2 is a side elevational view shown partly in section to show the interior construction thereof and Fig. 3 is a view similar to Fig. 2 but showing one of the parts of the invention applied to a plain dish whereas above in Figs. 1 and 2 there is shown a modified dish kept warm by a hot water jacket.

Referring now to Figs. 1 and 2, and in the practice of my invention, there is shown a children's easy-feeding dish, referred to collectively as 10, consisting of a plastic dish 11 having integrally formed compartments 12 provided by partitions 13 and a circular plastic ring 14 adapted to coincide with the upper edge 15 of the dish 11 in a manner to be hereinafter described.

The dish 11 is provided with an integrally formed double wall and bottom 16 whereby to provide an annular compartment 17 receiving hot water 18 by means of an opening 19 provided in the edge 15, the opening 19 communicating with the compartment 17 and being threaded internally to receive an externally threaded plug 20.

A plurality of spaced, upwardly extending pins 21 having enlarged heads 22 are rigidly secured to the edge 15. I prefer to have the lower portions of the pins threaded to engage threaded openings 23 provided in the edge 15, but it is obvious that the pins 21 may be secured to the edge 15 in any suitable manner.

The ring 14 is wider than the edge 15, and is provided with integrally formed brackets 24 which are wider than the upper edges of the partitions, which they normally overlie.

The ring 14 is further provided with key-hole slots 25 having enlarged portions adapted to pass the enlarged heads 22 and narrow portions adapted to pass the pins 21 below the enlarged heads. The ring 14 is further provided with an opening 26 adapted to receive the plug 20.

To assemble, the ring 14 is placed on top of the edge 15 of the dish 11 with the enlarged heads 22 of the pins 21 in the enlarged portions of the key-hole slots 25 and the plug 20 in the opening 26. Angular rotation of the ring 14 relative to the edge 15 brings the pins 21 into the narrow portions of the openings 25, with the ring 14 surrounding the narrow portions of the openings 25 engaging the undersurface of the enlarged heads 22 whereby to securely fasten the ring to the dish. The opening 26 is elongated to permit movement within its confines by the plug 20.

Referring now particularly to Fig. 2, it will be seen that the ring 14 overhangs the edge 15 thereby providing a ledge under which the child may easily get food into his spoon 27. The brackets 24 provide similar ledges over the partitions 13 and it will be readily apparent that wherever the spoon 27 is used it will contact an appropriate ledge formed by the ring 14 or the brackets 24 and will effectively prevent the child from scraping food out onto the table during eating.

The hot water 18 is compartment 17 will keep the food warm during the eating operation.

By reversing the rotation of the ring 14 relative to the dish 11 and edge 15 thereof, the pins 21 and enlarged heads 22 will move from the narrow portions to the enlarged portions of the keyhole slots 25, permitting easy and ready removal of the ring and permitting access to the various parts of the dish for cleaning purposes.

When the dish has been cleansed, the hot water 18 may be removed by unscrewing the plug 20 and emptying the water therefrom, to be later replaced with more hot water when the dish is to be used again.

Figure 3:
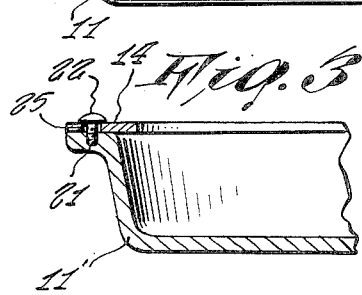

Referring now particularly to Fig. 3, there is shown the attachment of the ring 14 to a conventional dish 11', the rim of the dish being provided with the pins 21 and enlarged heads 22 as in the previous form, but lacking the compartments 13 and the double wall and bottom 16, as well as the opening 19 and plug 20. Thus, it is seen that with slight modification that the ring 14 may be used with conventional dishes now in use as an attachment.

It should now be apparent that there has been provided a children's easy-feeding dish which will aid small children both to learn to eat properly and to keep the food in the dish and which has a removable ring which permits ready access to the interior of the dish for cleaning, the ring being positioned above the dish to serve as a convenient ledge under which the child may easily get food into his spoon and which prevents him from scraping food out onto the table during eating. It should also be apparent that there has been provided a dish of the above type which includes a hot water jacket for keeping the food warm during eating and which dish is adapted to be fabricated entirely of plastic in mass production thereby making it accessible to the consumer at a relatively low cost.

While various changes may be made in the detailed construction, it shall be understood that such changes shall be within the spirit and scope of the present invention as defined by the appended claims:

Having thus set forth and disclosed the nature of my invention, what is claimed is:

1. As a new article of manufacture, the combination of a substantially circular plastic dish having an integrally formed, upwardly extending, peripheral wall, a substantially circular plastic ring adapted to overlie the upper edge of said peripheral wall, said ring being wider than said upper edge of said wall and adapted to overhang said edge at the inner side of said peripheral wall, a plurality of partitions integrally formed in said dish and peripheral wall whereby to divide said dish into a plurality of compartments, a plurality of arms integrally formed in said ring and adapted to overlie the upper edges of said partitions, said arms being wider than the upper edges of said partitions whereby to overhang said upper edges at either side thereof, a plurality of spaced pins rigidly secured to the upper edge of said wall, said pins having enlarged heads, said ring having a plurality of spaced substantially key-hole shaped slots having enlarged portions and narrow portions, said enlarged heads being adapted to enter said enlarged portions but larger than said narrow portions of said keyhole slots whereby to releasably secure said ring to said upper edge of said peripheral wall upon angular rotation of said ring relative to said upper edge of said peripheral wall.

2. As a new article of manufacture, the combination of a substantially circular plastic dish having an integrally formed, upwardly extending peripheral wall, a substantially circular plastic ring adapted to overlie the upper edge of said peripheral wall, said ring being wider than said upper edge of said peripheral wall and adapted to overhang said edge at the inner side of said wall, an integrally formed inner wall and bottom for said dish whereby to provide a hot water compartment, said upper edge of said wall having an opening communicating with said compartment, said opening being substantially circular, with a threaded periphery, an externally threaded plug to be screwed into said opening, a plurality of partitions integrally formed in said inner wall and bottom whereby to divide said dish into a plurality of compartments, a plurality of arms integrally formed in said ring and adapted to overlie the upper edges of said partitions, said arms being wider than the upper edges of said partitions whereby to overhang said upper edges at either side thereof, a plurality of bolts rigidly secured to the upper edge of said peripheral wall, enlarged heads on said bolts, said ring having a plurality of corresponding substantially key-hole shaped slots having enlarged portions and narrow portions, said enlarged heads being adapted to enter said enlarged portions but being larger than said narrow portions, said ring further having an elongated opening adapted to receive said plug, whereby to releasably secure said ring to said dish at the upper edge of said peripheral wall upon angular rotation of said ring relative to said upper edge of said peripheral wall.

References Cited in the file of this patent

UNITED STATES PATENTS

| Number | Name | Date |
|---|---|---|
| 95,742 | Stevens | Oct. 12, 1869 |
| 868,312 | Wilcox | Oct. 15, 1907 |
| 889,434 | Bustanoby | June 2, 1908 |
| 1,123,793 | Pick | Jan. 5, 1915 |
| 1,474,108 | Downey | Nov. 13, 1923 |
| 1,582,290 | Marchessault | Apr. 27, 1926 |
| 2,108,863 | Kieft | Feb. 22, 1938 |
| 2,240,602 | Bartsch | May 6, 1941 |
| 2,438,546 | Davis | Mar. 30, 1948 |

FOREIGN PATENTS

| Number | Country | Date |
|---|---|---|
| 4,473 | Great Britain | Mar. 30, 1886 |
| 331,025 | Great Britain | June 26, 1930 |